United States Patent
Cohn

(10) Patent No.: US 9,729,350 B1
(45) Date of Patent: Aug. 8, 2017

(54) MAINTAINING PACKET ORDER IN NETWORK FLOWS OVER AN AUTONOMOUS NETWORK

(75) Inventor: Daniel T. Cohn, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/073,182

(22) Filed: Mar. 28, 2011

Related U.S. Application Data

(60) Provisional application No. 61/332,428, filed on May 7, 2010.

(51) Int. Cl.
*H04L 12/801* (2013.01)
*H04L 12/54* (2013.01)
*H04L 12/70* (2013.01)

(52) U.S. Cl.
CPC .... *H04L 12/5601* (2013.01); *H04L 2012/565* (2013.01)

(58) Field of Classification Search
CPC ......... H04L 47/34; H04L 47/10; H04L 45/24; H04L 47/28
USPC ........................................ 370/389, 394, 235
See application file for complete search history.

(56) References Cited

U.S. PATENT DOCUMENTS

| | | | |
|---|---|---|---|
| 5,548,593 A * | 8/1996 | Peschi | 370/394 |
| 5,648,970 A * | 7/1997 | Kapoor | 370/394 |
| 6,246,684 B1 * | 6/2001 | Chapman et al. | 370/394 |
| 7,330,439 B1 * | 2/2008 | Puuskari et al. | 370/252 |
| 2003/0162499 A1 * | 8/2003 | Jonsson | H04L 45/04 370/351 |
| 2006/0291392 A1 * | 12/2006 | Alicherry et al. | 370/235 |
| 2007/0268861 A1 * | 11/2007 | Diachina et al. | 370/329 |
| 2008/0028467 A1 * | 1/2008 | Kommareddy et al. | 726/23 |
| 2013/0114594 A1 * | 5/2013 | Van Zijst | 370/390 |
| 2013/0155923 A1 * | 6/2013 | Yi et al. | 370/310 |

* cited by examiner

*Primary Examiner* — Robert M Morlan
*Assistant Examiner* — Mandish Randhawa
(74) *Attorney, Agent, or Firm* — Lee & Hayes, PLLC; Charles L. Warner

(57) ABSTRACT

Technologies are described herein for maintaining packet order in network flows over an autonomous network. A sequence number is generated for each data packet in the network flow. The data packets are transmitted from a source endpoint to a destination endpoint accompanied by the sequence number. When a data packet is received at the destination endpoint, the sequence number is utilized to determine whether the packet has arrived out-of-order. If the received data packet is out-of-order, the packet is buffered for a specific period of time, or until the next sequential packet in the network flow is received. If the next sequential packet is received within the time period, the received packet and any buffered packets are delivered in sequence number order to a program executing on the destination endpoint. If the time period expires before receiving the next sequential data packet, the buffered packet(s) are delivered to the program.

16 Claims, 7 Drawing Sheets

MAINTAINING PACKET ORDER IN NETWORK FLOWS OVER AN AUTONOMOUS NETWORK

CROSS-REFERENCE TO RELATED APPLICATION

This application claims the benefit of U.S. provisional patent application No. 61/332,428, filed on May 7, 2010, and entitled "Maintaining Packet Order in Network Flows Over An Autonomous Network" which is expressly incorporated herein by reference in its entirety.

BACKGROUND

An autonomous network is a network comprising a number of communication links, routers, and other connection devices that are maintained and managed by a single organization or group for the purposes of connecting internal computer systems, or "endpoints." Generally, a single routing protocol, referred to as an interior gateway protocol ("IGP"), may be implemented across the entire autonomous network. The IGP may consist of a distance-vector routing protocol, such as routing information protocol ("RIP") or interior gateway routing protocol ("IGRP"), a link-state routing protocol, such as intermediate system to intermediate system ("IS-IS") or open shortest path first ("OSPF"), or other routing protocol known in the art.

Each router in the autonomous network may maintain a routing table that contains a list of endpoints reachable through the router's immediate neighbors in the network, along with a metric, or "cost," for each. The cost calculated for each path may be based on, individually or in combination, the number of network hops required to reach the endpoint, the bandwidth of the connecting link(s) in the path, the network delay between the router and the endpoint, a reliability factor for the link(s) in the path, and the like. When a data packet arrives at a router, the router may utilize the routing table to determine the lowest-cost path for reaching the destination endpoint, and forward the packet to the immediate neighbor along that path. Each router along the path forwards the data packet based on a similar determination of the lowest-cost path to the endpoint, until the packet arrives at the destination endpoint.

It will be appreciated that more than one "best path" to the destination endpoint may exist in the network, i.e. more than one path having the same cost. The IGP may further utilize equal-cost multi-path routing ("ECMP") to select from among the multiple best paths over which to forward the data packet. The ECMP implementation may utilize a round-robin selection, a randomization function, or other mechanism to balance the network load across the paths, thus potentially increasing the available bandwidth of the network.

Transmitting packets between the same source and destination endpoints over different paths may cause problems in the operation of transport protocols that depend upon the order of the packets transmitted and received, such as transmission control protocol ("TCP"). To mitigate these potential problems, the ECMP implementation may utilize a flow-based deterministic algorithm for selecting from among the best paths for each data packet, such that packets within the same network flow utilize the same path across the network. However, in long-lived, high-bandwidth network flows between two endpoints, such flow-based deterministic algorithms may result in under-utilization of the available bandwidth of the autonomous network.

It is with respect to these and other considerations that the disclosure made herein is presented.

DETAILED DESCRIPTION

Figure 1:
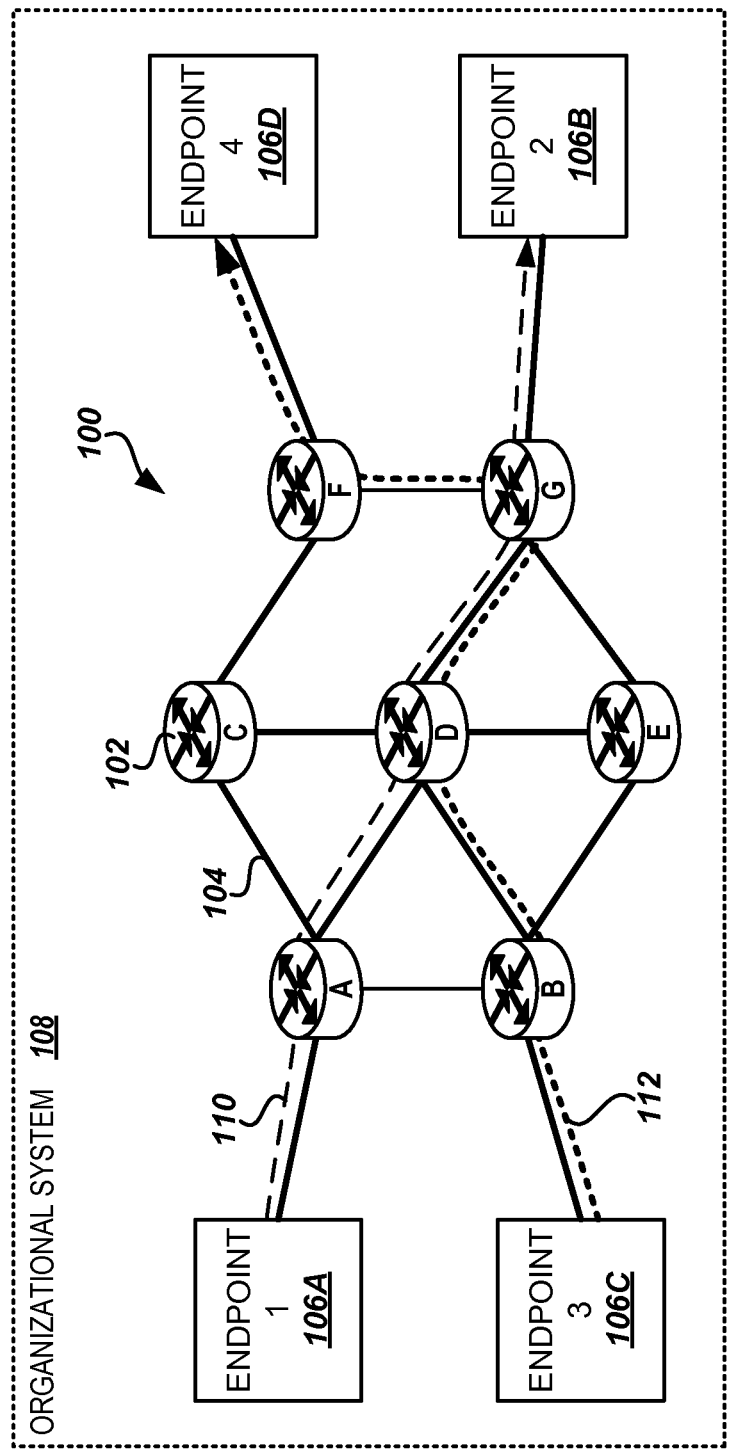
FIG. 1 is a network diagram showing aspects of an illustrative autonomous network, according to embodiments presented herein.

The following detailed description is directed to technologies for maintaining packet order in network flows over an autonomous network implementing per-packet, multi-path routing. Utilizing the embodiments described herein, the order of packets in a network flow may be maintained by the source and destination endpoints. This allows the routers of the autonomous network connecting the endpoints to utilize a round-robin selection, randomization function, or other per-packet multi-path routing mechanism for forwarding packets within the flow over multiple best paths, thus balancing the load on the communication links of the network and achieving higher utilization of the available bandwidth.

According to embodiments, a sequence number is generated for each data packet in a network flow between two endpoints on the network. Each data packet is transmitted from the source endpoint across the network to the destination endpoint accompanied by the sequence number. Upon being received at the destination endpoint, the sequence number is utilized to determine whether the received data packet has arrived out-of-order. If the received data packet is out-of-order, the packet is buffered for a specific period of time, or until the next sequential data packet in the network flow is received. If the next sequential data packet is received within the specific period of time, the received packet and any buffered data packets are delivered in sequence number order to a program executing on the destination endpoint. If the specific period of time expires before the next sequential data packet is received, the buffered data packet(s) are delivered to the program.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 2:
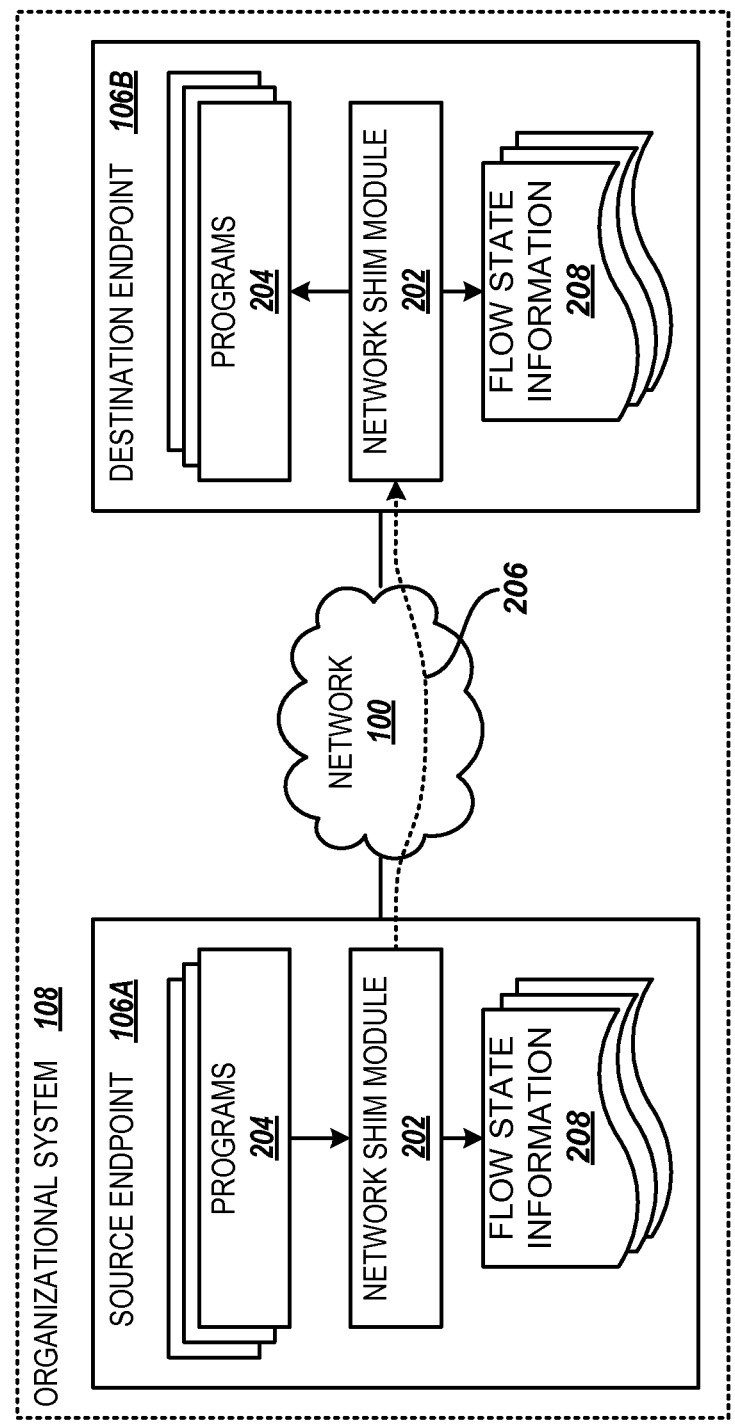
FIG. 2 is a systems and network diagram showing aspects of an illustrative operating environment for maintaining packet order in network flows over the autonomous network, including several software and hardware components provided by embodiments presented herein.

FIGS. 1 and 2 and the following description are intended to provide a brief, general description of a suitable computing environment in which the embodiments described herein may be implemented. In particular, FIG. 1 shows an illustrative autonomous network 100, according to embodiments provided herein. The autonomous network 100 includes a number of routers 102 or other switching elements interconnected by a number of communication links 104. The autonomous network 100 is further connected to multiple communication endpoints 106A-106D (referred to herein generally as endpoints 106) within an organizational system 108. The endpoints 106 may represent computer systems, such as application servers, storage servers, database servers, communication servers, and the like, executing in the organizational system 108.

According to embodiments, the autonomous network 100 and the endpoints 106 are managed completely within the organization. As such, the routers 102 and other switching elements within the network 100 may be configured with a single interior gateway protocol ("IGP"), and the parameters and characteristics of the network may be relatively stable and well known. In one embodiment, a maximum network delay between endpoints 106 can be established for the network 100. The maximum network delay may represent the maximum amount of time that it may take a packet to successfully travel across the network 100 between any two endpoints 106 in the organizational system 108. The maximum network delay may be determined based on the characteristics of the network routers 102 and communication links 104, including the IGP implemented within the network 100, processing and queuing delays occurring in the routers, transmission delays occurring at endpoints 106, propagation delay across the various communication links, and the like. In one embodiment, the maximum network delay for the autonomous network 100 may be sub-millisecond.

A transmission of a data packet between two endpoints 106 across the network 100 may traverse multiple routers 102 and communication links 104 as the packet travels along the selected path through the network, depending upon the algorithms implemented by the IGP configured for the routers. For example, a data packet transmitted from endpoint 1 106A to endpoint 2 106B may follow a path through router A, then through router D, and finally through router G, as indicated by line 110 in FIG. 1. Similarly, a data packet transmitted from endpoint 3 106C to endpoint 4 106D may follow a path through router B, then through router D, then through router G, and finally through router F, as indicated by line 112.

The IGP implemented on the network 100 utilizes a per-packet multi-path routing mechanism, such as equal-cost multi-path routing ("ECMP"), that allows each router 102 to select from multiple best paths over which to forward each data packet travelling across the network. The per-packet multi-path routing mechanism may utilize a round-robin selection, a randomization function, or other mechanism to balance the network load across the paths. It will be appreciated that, because of variations or instability that may occur in the network 100, transmitting data packets from the source endpoint 106 over separate, equal-cost paths across the network may cause the packets to arrive at the destination endpoint in a different order from which the packets were transmitted. This may cause problems in the operation of transport protocols that depend upon the order of the packets transmitted and received, such as the transmission control protocol ("TCP").

As described above, traditional ECMP mechanisms may further implement a flow-based deterministic algorithm for selecting among the best paths to prevent transmitting data packets in the same network flow over different paths. The network flow may be established based on the unique combination of source and destination addresses in the packet header, together with the transport protocol, the source and/or destination ports, and the like. For example, the ECMP implementation may select the forwarding path for a data packet by hashing the flow-related data in the packet header.

However, in long-lived, high-bandwidth network flows between two endpoints, such as those that may occur between storage servers connected to the autonomous network 100, the use of flow-based deterministic algorithms for selecting a forwarding path may result in under-utilization of the available bandwidth. For example, a high-bandwidth network flow between endpoint 1 106A and endpoint 2 106B, indicated by line 110 in FIG. 1, may utilize the full bandwidth of the communication links 104 along the selected path through routers A, D, and G, while the links along other paths between the endpoints go unutilized. Further, a long-lived, high-bandwidth network flow between endpoint 1 106A and endpoint 2 106B may block a network flow between two other endpoints utilizing a same communication link along its selected path, such as the path indicated by line 112 between endpoint 3 106C and endpoint 4 106D.

According to embodiments described herein, because the order of data packets in a network flow are managed at the endpoints, the IGP implemented within the autonomous network 100 does not utilize a flow-based deterministic algorithm for routing packets through the network. This may be accomplished by configuring each router 102 on the autonomous network to disable the flow-based deterministic algorithm in the ECMP mechanism, for example. In another embodiment, the routers 102 in the autonomous network 100 are configured to utilize a specific load-balancing mechanism for selecting from among the multiple best paths, such as a per-packet round-robin mechanism.

FIG. 2 is a system and network diagram showing details of the endpoints 106 in the organizational system 108, including several software components for maintaining packet order in network flows over the autonomous network 100, according to embodiments provided herein. Each endpoint 106 includes a network shim module 202 that controls the flow of data packets across the network 100 from other programs 204 executing on the endpoint, such as application software, operating systems, virtual machine managers, and the like. The network shim module 202 may be implemented on the endpoint as software, hardware, or any combination of the two, and may consist of any number of software and/or hardware-based subcomponents.

The network shim modules 202 may implement an overlay network that provides a number of virtual links 206 between endpoints, such as endpoints 106A and 106B, independent of the physical topology of the underlying network 100 connecting the endpoints. A program 204 executing on a source endpoint 106A, for example, may transmit data packets over the virtual link 206 to a program executing on a destination endpoint 106B across the overlay network implemented by the network shim modules 202. The overlay network may operate in a protocol-agnostic fashion, allowing the programs 204 to transmit data packets in any number of protocols across the network. Each data packet may be encapsulated into an overlay frame that allows the network shim module 202 executing on the source endpoint 106A to include additional data with the packet for use by the corresponding network shim module executing on the destination endpoint 106B.

According to embodiments, the network shim module 202 executing on the source endpoint 106A generates a sequence number to accompany each data packet transmitted to the destination endpoint 106B as part of a network flow. A network flow comprises a sequence of packets from a particular source to a particular destination. As described above, the network flow associated with a data packet may be identified by the unique combination of the source and destination addresses in the packet header, for example. The network flow may further be distinguished by the transport protocol identified in the packet header, the source and/or destination ports specified in the packet, or other flow-related data contained in the packet header or packet data.

The network shim module 202 executing on the source endpoint 106A may maintain state information 208 for each active network flow. The state information 208 may include a counter of packets within the network flow. In one embodiment, the network shim module 202 increments the packet counter with each data packet transmitted to the destination endpoint 106B in the network flow, and utilizes the packet counter value as the sequence number of the packet. The sequence number may be included in the overlay frame in which the data packet is encapsulated, for example. It will be appreciated that the network shim module 202 may utilize other methods known in the art for generating a sequence number for each data packet in the network flow, and transmitting the sequence number along with the packet to the destination endpoint 106B.

As will be described in more detail below in regard to FIGS. 5A and 5B, the network shim module 202 executing on the destination endpoint 106B utilizes the sequence number to determine if a data packet is received out-of-order. When a data packet arrives out-of-order, the network shim module 202 may buffer the packet until the next sequential data packet in the network flow is received. Upon receiving the next sequential data packet, the network shim module 202 delivers the received data packet along with any buffered packets in sequence number order to the target program 204 executing on the destination endpoint 106B. In this way, the order of the data packets transmitted by the source endpoint 106A may be preserved at the destination endpoint 106B, regardless of whether the packets are delivered by the autonomous network 100 connecting the endpoints in the correct order or not.

Figure 3:
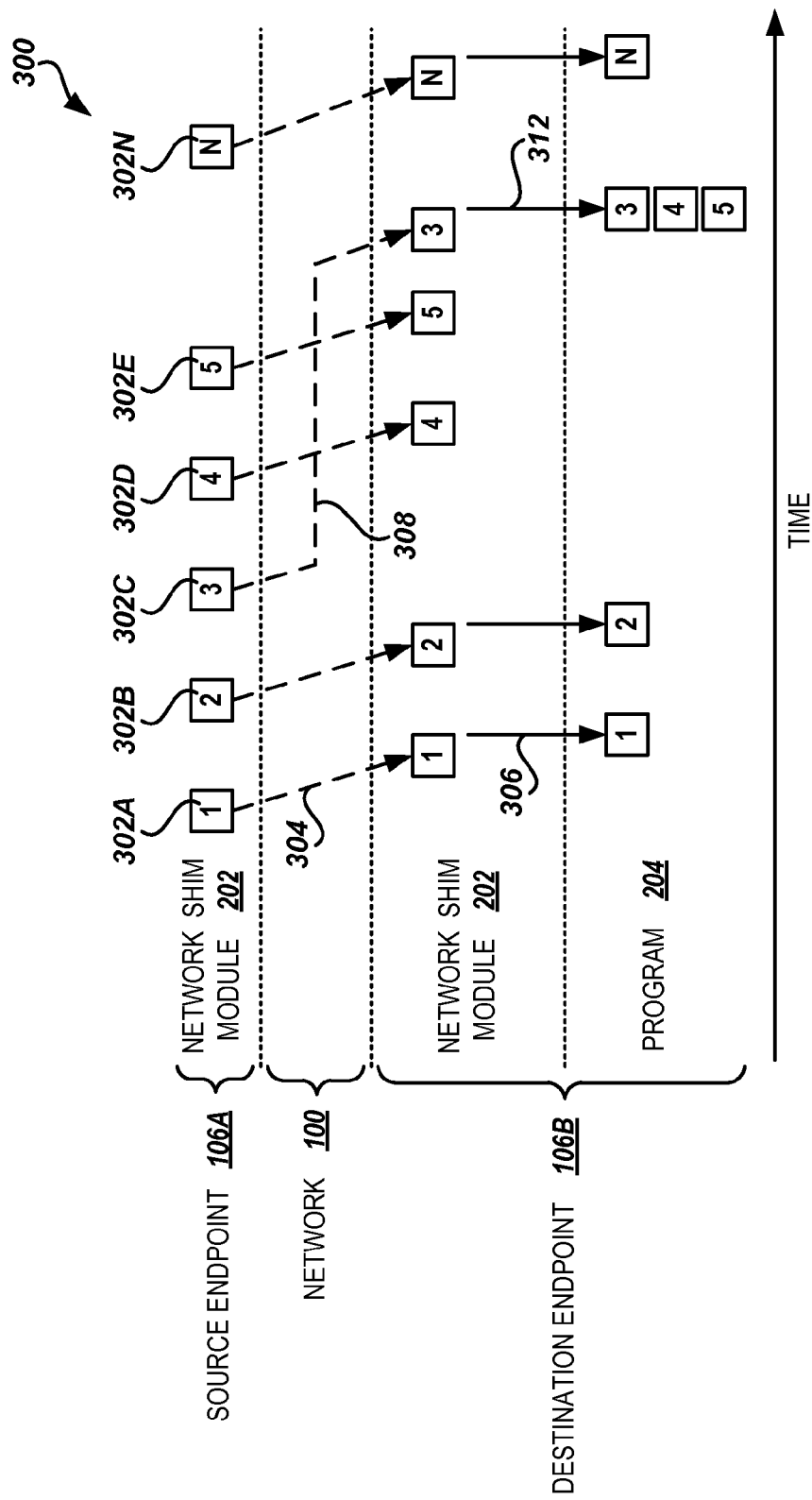
FIGS. 3 and 4 are block diagrams showing the timing of ordered data packets transmitted between endpoints over the autonomous network, according to embodiments described herein.

FIG. 3 is a timing diagram illustrating an example of the sequence of data packets in a network flow transmitted from the source endpoint 106A to the destination endpoint 106B over the autonomous network 100, according to embodiments. As shown in the figure, the network shim module 202 executing on the source endpoint 106A generates a sequence number for each data packet 302A-302N (also referred to herein as data packet 302) in the network flow. Each data packet 302 is then transmitted, along with its sequence number, across the network 100 to the destination endpoint 106B, as indicated by the dashed lines, such as line 304. Each data packet 302 is received by the corresponding network shim module 202 executing on the destination endpoint 106B. If a received data packet 302 is in the correct sequence order, then the network shim module 202 delivers the packet to the target program 204 executing on the destination endpoint 106B, as indicated at 306 in FIG. 3.

As described above in regard to FIG. 1, the routers 102 of the autonomous network 100 are configured to utilize a per-packet multi-path routing mechanism. As such, data packets 302 in the network flow may utilize different paths through the network when traveling from the source endpoint 106A to the destination endpoint 106B. It will be appreciated, therefore, that it is possible for a data packet 302 to arrive at the destination endpoint 106B out-of-order. For example, data packet 3 302C may be delayed as it travels across the network 100, as indicated by line 308, causing data packet 4 302D and data packet 5 302E to arrive at the destination endpoint 106B before data packet 3.

According to embodiments, the network shim module 202 executing on the destination endpoint 106B will buffer the out-of-order data packets 302D and 302E until the next sequential packet in the network flow, data packet 3 302C, is received. Upon receiving data packet 3 302C, the network shim module 202 will deliver the received data packet 3, and the buffered data packet 4 and data packet 5, to the target program 204 in sequence number order, as shown in FIG. 3 at 312.

As will be described in more detail below in regard to FIGS. 5A and 5B, the out-of-order data packets are held in the buffer for a specific period of time. If the next sequential data packet in the network flow is not received at the destination endpoint 106B within the time period, the network shim module 202 will deliver the buffered data packet(s) to the target program 204 in sequence number order. In one embodiment, the specific period of time is the maximum network delay value established for the autonomous network 100, as described above in regard to FIG. 1.

Figure 4:
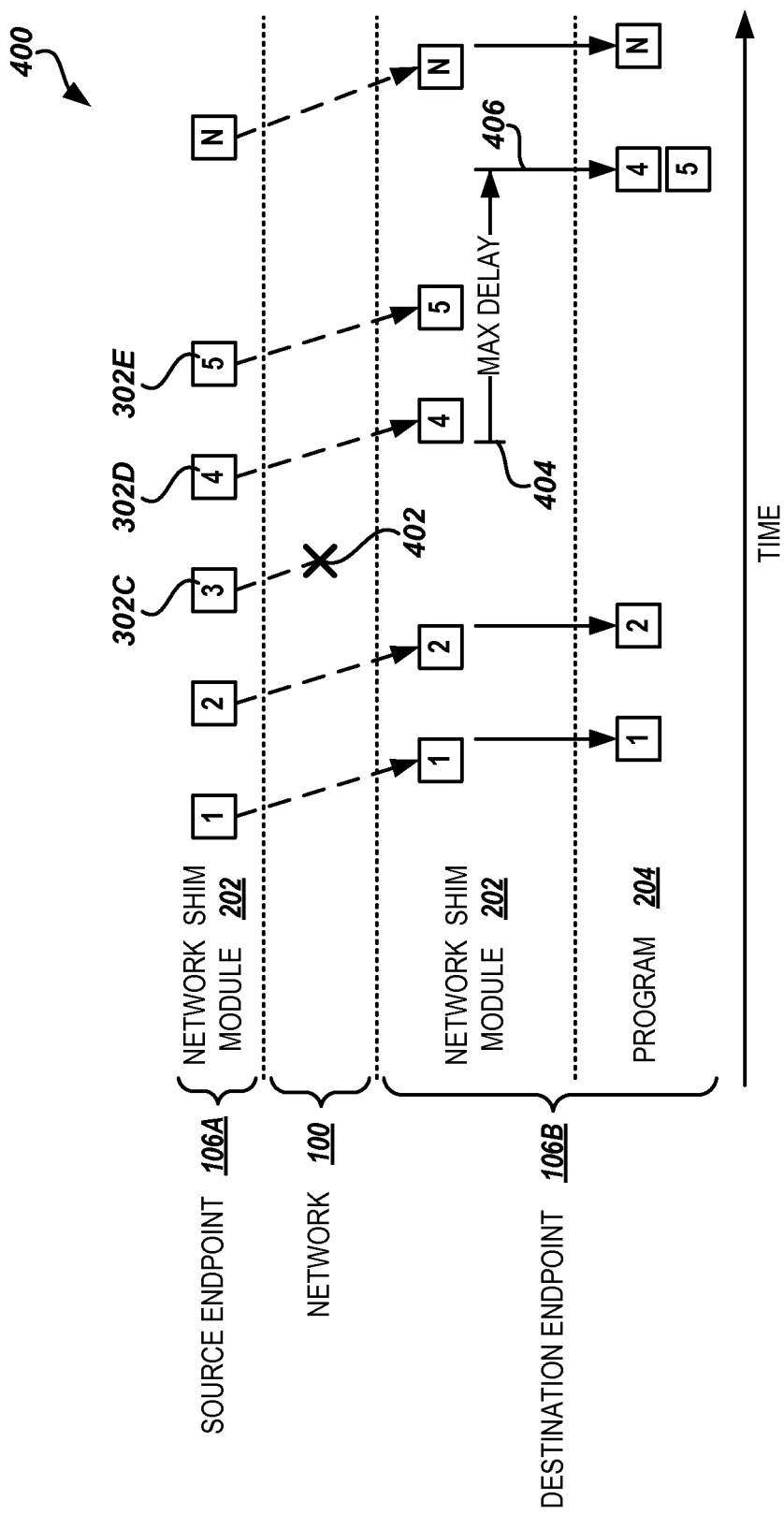

FIG. 4 illustrates the use of the maximum network delay value for controlling the time of buffering the out-of-order data packets. As shown in the figure, data packet 3 302C may be lost in transmission across the network 100, as indicated at 402. Upon receiving the first out-of-order data packet, data packet 4 302D, the network shim module 202 starts a timer set for the maximum network delay value, as indicated at 404. The out-of-order data packet 4 302D is then buffered, along with any subsequently received out-of-order data packets, such as data packet 5 302E. Upon expiration of the timer, if the next sequential data packet, data packet 3 302C, has not been received, the network shim module 202 delivers the buffered data packet 4 302D and data packet 5

302E to the target program 204 in sequence number order, as indicated at 406 in FIG. 4.

Figure 5A:
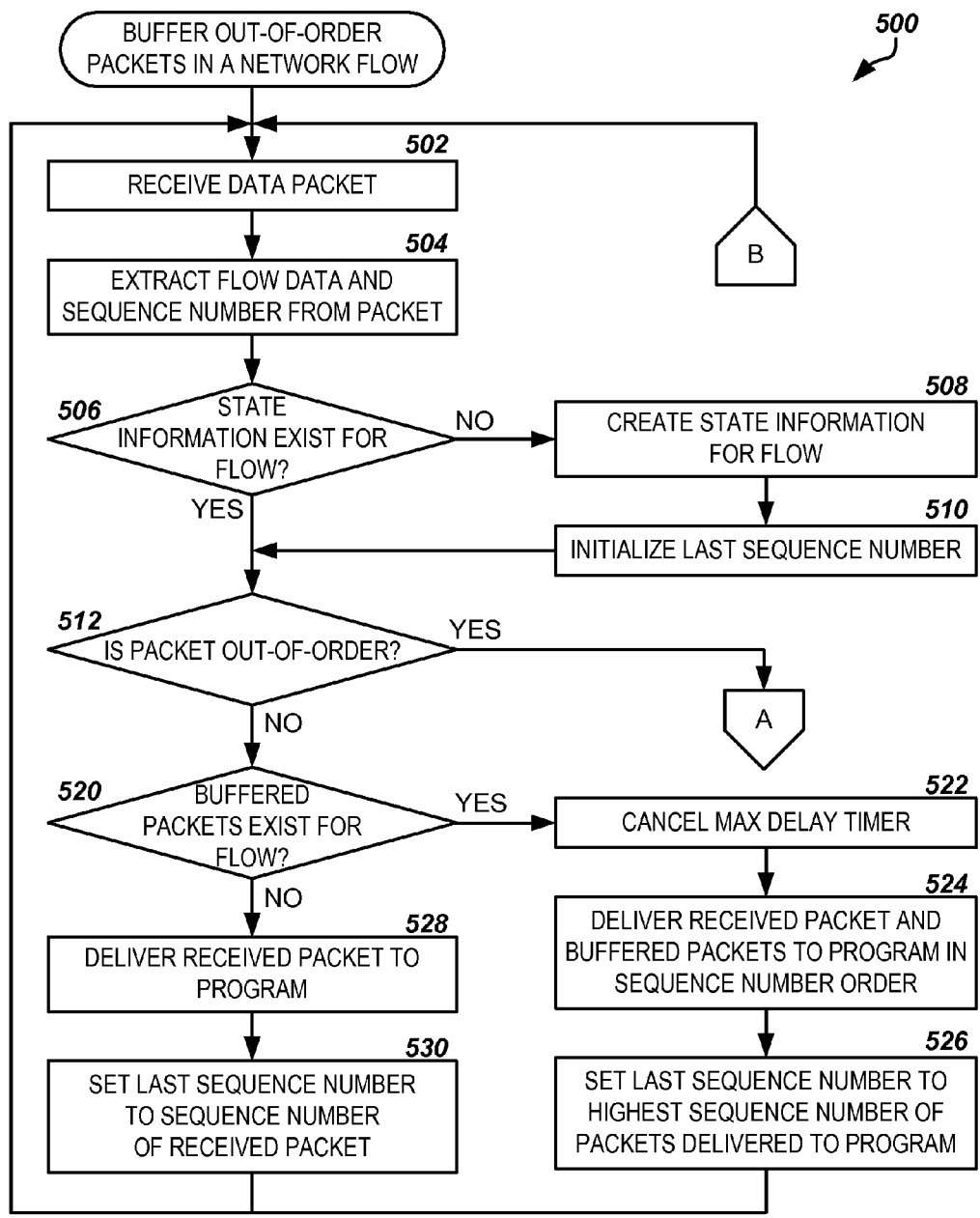
FIGS. 5A and 5B are flow diagrams showing a method for maintaining packet order in network flows over the autonomous network, according to embodiments described herein.
Figure 5B:
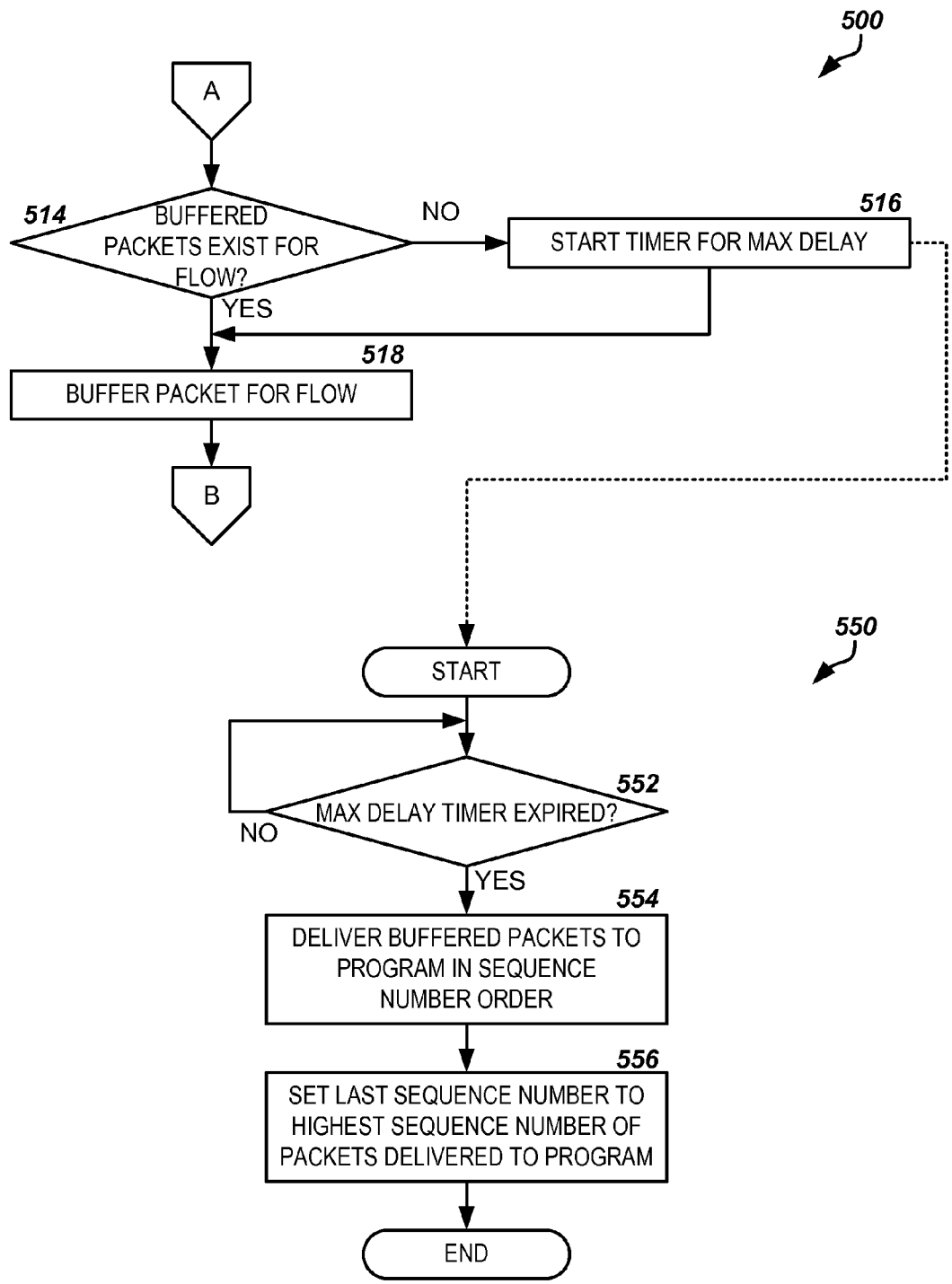

Turning now to FIGS. 5A and 5B, additional details will be provided regarding the embodiments presented herein for maintaining packet order in network flows over an autonomous network. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 5A and 5B illustrate a routine 500 for buffering out-of-order data packets for a network flow, according to the embodiments described herein. In one embodiment, the routine 500 is performed by the network shim module 202 executing on the destination endpoint 106B. It will be appreciated that the routine 500 may also be performed by some other module or component, or by a combination of modules and components on the destination endpoint 106B or in the autonomous network 100.

As shown in FIG. 5A, the routine 500 begins at operation 502, where the network shim module 202 receives a data packet 302 from the network 100. From operation 502, the routine 500 proceeds to operation 504, where the network shim module 202 extracts the flow data identifying the network flow and the sequence number from the data packet 302. As described above in regard to FIG. 2, each data packet 302 may be encapsulated into an overlay frame that contains the sequence number in the frame header. The flow data may be extracted from the frame header, the header of the encapsulated data packet 302, or the packet data. As further described above, the flow data may consist of the unique combination of the source address, the destination address, the transport protocol, the source port, the destination port, and/or other flow-related data from the packet header or packet data.

The routine 500 proceeds from operation 504 to operation 506, where the network shim module 202 determines whether state information 208 exists for the network flow identified by the extracted flow data. If no flow state information 208 exists, the routine 500 proceeds to operation 508, where network shim module 202 creates the state information for the network flow. According to one embodiment, the state information 208 maintained for each active network flow includes a last sequence number, indicating the sequence number of the last data packet 302 in the network flow delivered to the target program 204 executing on the destination endpoint 106B. From operation 508, the routine 500 proceeds to operation 510, where the network shim module 202 initializes the last sequence number in the newly created flow state information 208 to indicate that no data packets in the network flow have been delivered to the target program 204. For example, the network shim module 202 may set the last sequence number in the flow state information 208 to zero.

The routine 500 then proceeds to operation 512, where the network shim module 202 determines whether the received data packet 302 is out-of-order. The network shim module 202 may compare the sequence number extracted from the data packet 302 in operation 504 to the last sequence number from the flow state information 208 maintained for the network flow. If the sequence number of the received packet is not one more than the last sequence number, then the received packet may be out-of-order.

If the network shim module 202 determines that the received data packet 302 is out-of-order, then the routine 500 proceeds from operation 512 to operation 514, as shown in FIG. 5B, where the network shim module 202 determines if buffered data packets already exist for the network flow. This may be the case if the received data packet 302 is not the first out-of-order packet received in the network flow. If the network shim module 202 determines that buffered packets do not exist for the network flow, i.e. the received data packet is the first out-of-order packet, then the routine proceeds from operation 514 to operation 516, where the network shim module 202 starts a timer for a period of time equal to the maximum network delay established for the network. The network shim module 202 may schedule a system timer or hardware timer implemented on the destination endpoint 106B to raise a software interrupt after the maximum network delay period, for example.

Next, the routine 500 proceeds to operation 518, where the network shim module 202 buffers the out-of-order data packet 302. This may be accomplished by storing the data packet 302 in temporary storage associated with the state information 208 maintained on the destination endpoint 106B for the network flow. From operation 518, the routine returns to operation 502 in FIG. 5A, where the network shim module 202 waits for the next data packet 302 in the network flow.

If, at operation 512, the network shim module 202 determines that the received data packet 302 is not out-of-order, then the routine 500 proceeds to operation 520, where the network shim module 202 determines if buffered data packets exist for the network flow. This may be the case if out-of-ordered data packets 302 in the network flow were previously received at the destination endpoint 106B and were buffered by the network shim module 202 in operation 518, described above. If buffered data packets exist for the flow, then the routine 500 proceeds from operation 520 to operation 522, where the network shim module 202 cancels the maximum network delay timer that was set when the first out-of-order data packet was received, as described above in regard to operation 516.

From operation 522, the routine 500 proceeds to operation 524, where the network shim module 202 delivers the received data packet 302 and the buffered data packets to the target program 204 executing on the destination endpoint 106B in order of their respective sequence numbers. In this way, the target program 204 is presented with the data packets in sequence number order, regardless of whether the packets are delivered by the autonomous network 100 connecting the endpoints 106 in the correct order or not. From operation 524, the routine 500 proceeds to operation 526, where the network shim module 202 sets the last sequence number in the state information 208 maintained for the network flow to the highest sequence number of the data packets delivered to the target program 204. From operation 526, the routine returns to operation 502, where the network shim module 202 waits for the next data packet 302 in the network flow.

If, at operation 520, the network shim module 202 determines that buffered data packets do not exist for the network flow, i.e. no out-of-order data packets have been received in the flow, then the routine 500 proceeds to operation 528, where the network shim module 202 delivers the received data packet 302 to the target program 204 executing on the destination endpoint 106B. The routine 500 then proceeds to operation 530, where the network shim module 202 sets the last sequence number in the state information 208 maintained for the network flow to the sequence number of the received data packet 302. From operation 530, the routine 500 returns to operation 502, where the network shim module 202 waits for the next data packet 302 in the network flow.

FIG. 5B further illustrates a routine 550 for utilizing the maximum network delay value to control the time of buffering out-of-order data packets 302 in the network flow, according to the embodiments described herein. In one embodiment, the routine 550 is initiated by the network shim module 202 upon receiving the first out-of-order data packet 302, as described above in regard to FIG. 4. The routine 550 begins at operation 552, where the network shim module 202 determines if the maximum network delay period has expired since the first out-of-order data packet 302 was received. This may be indicated by the expiration of the maximum network delay timer set in operation 516, described above.

If the maximum network delay timer has expired, the routine 550 proceeds from operation 552 to operation 554, where the network shim module 202 delivers any buffered data packets 302 to the target program 204 executing on the destination endpoint 106B in order of their respective sequence numbers. From operation 554, the routine 550 proceeds to operation 556, where the network shim module 202 sets the last sequence number in the state information 208 maintained for the network flow to the highest sequence number of the data packets 302 delivered to the target program 204. From operation 556, the routine 550 ends.

Figure 6:
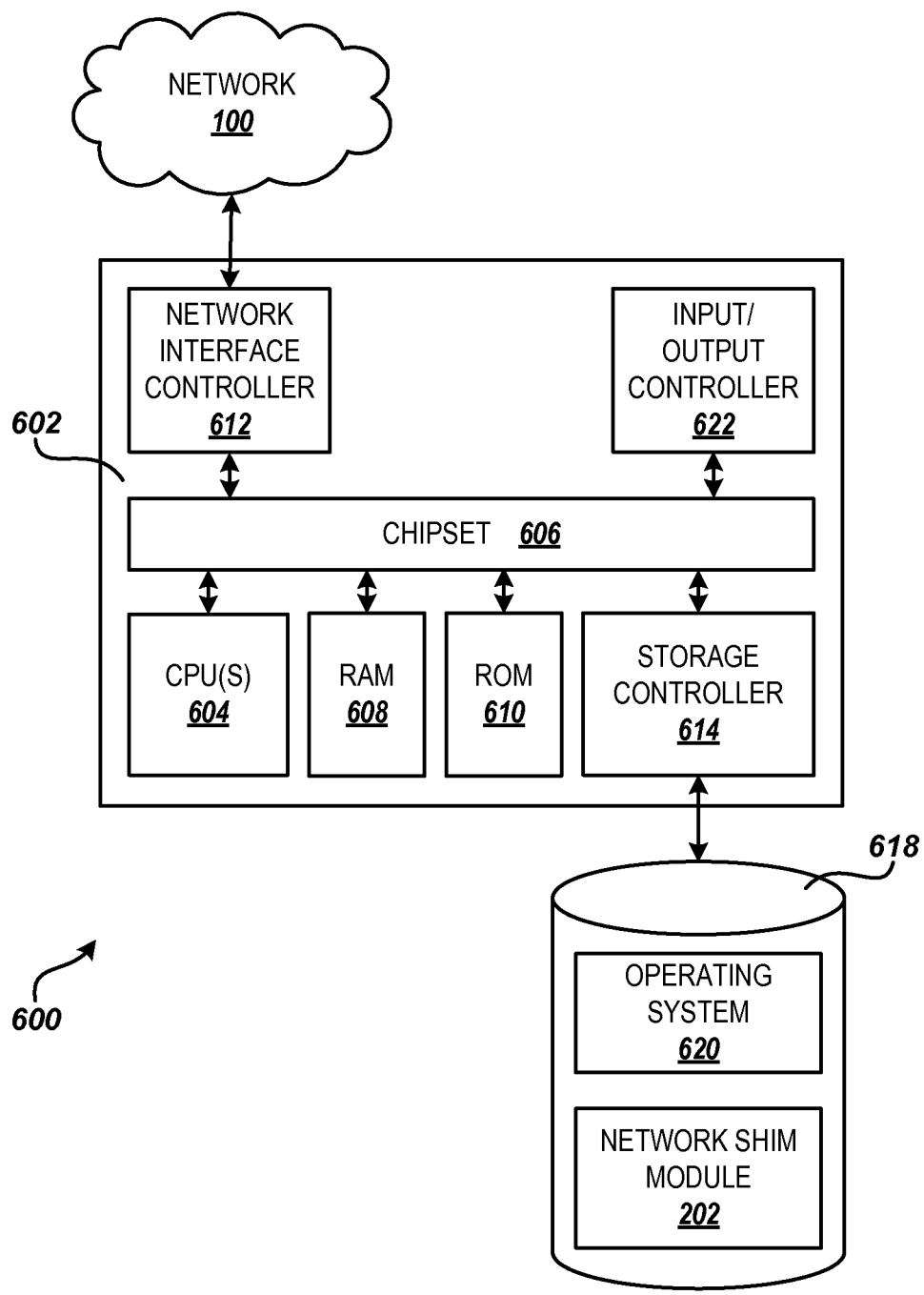
FIG. 6 is a computer architecture diagram showing an illustrative computer hardware architecture for computing devices described in embodiments presented herein.

FIG. 6 shows an example computer architecture 600 for a computer 602 capable of executing the software components described herein for maintaining packet order in network flows over an autonomous network, in the manner presented above. The computer architecture 600 shown in FIG. 6 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the endpoints 106 or other computing platform.

The computer 602 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 602.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 602. The chipset 606 may further provide an interface to a computer-readable storage medium such as a read-only memory ("ROM") 610 or non-volatile RAM ("NVRAM") for storing basic routines that help to startup the computer 602 and to transfer information between the various components and devices. The ROM 610 or NVRAM may also store other software components necessary for the operation of the computer 602 in accordance with the embodiments described herein.

As described above in regard to FIG. 1, the computer 602 may operate in a networked environment using logical connections to remote computing devices and computer systems through the autonomous network 100. The chipset 606 includes functionality for providing network connectivity through a network interface controller ("NIC") 612, such as a gigabit Ethernet adapter. The NIC 612 is capable of connecting the computer 602 to other computing devices over the network 100, such as other endpoints 106 within the organizational system 108. It should be appreciated that any number of NICs 612 may be present in the computer 602, connecting the computer to other types of networks and remote computer systems.

The computer 602 may be connected to a mass storage device 618 that provides non-volatile storage for the computer. The mass storage device 618 may store system programs, application programs, other program modules, and data, which are described in greater detail herein. The mass storage device 618 may be connected to the computer 602 through a storage controller 614 connected to the chipset 606. The mass storage device 618 may consist of one or more physical storage units. The storage controller 614 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 602 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like. For example, the computer 602 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 may further read information from the mass storage device 618 by detecting the physical states or characteristics of one or more particular locations within the physical storage units.

In addition to the mass storage device 618 described above, the computer 602 may have access to other computer-readable storage media to store and retrieve information, such as program modules, data structures, or other data. It should be appreciated by those skilled in the art that computer-readable storage media can be any available media that may be accessed by the computer 602. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 618 may store an operating system 620 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 618 may store other system or application programs and data utilized by the computer 602, including the network shim module 202 described above in regard to FIG. 1. In one embodiment, the mass storage device 618 or other computer-readable storage media may be encoded with computer-executable instructions that, when loaded into the computer 602, may transform the computer from a general-purpose computing system into a special-purpose computer capable of implementing the embodiments described herein. These computer-executable instructions transform the computer 602 by specifying how the CPUs 604 transition between states, as described above. According to one embodiment, the computer 602 may have access to computer-readable storage media storing computer-executable instructions that, when executed by the computer, perform the routines 500 and 550 for maintaining packet order in network flows over an autonomous network, as described above in regard to FIGS. 5A and 5B.

The computer 602 may also include an input/output controller 622 for receiving and processing input from a number of input devices, such as a keyboard, a mouse, a touchpad, a touch screen, an electronic stylus, or other type of input device. Similarly, the input/output controller 622 may provide output to a display device, such as a computer monitor, a flat-panel display, a digital projector, a printer, a plotter, or other type of output device. It will be appreciated that the computer 602 may not include all of the components shown in FIG. 6, may include other components that are not explicitly shown in FIG. 6, or may utilize an architecture completely different than that shown in FIG. 6.

Based on the foregoing, it should be appreciated that technologies for maintaining packet order in network flows over an autonomous network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A method comprising:
   establishing a maximum network delay, the maximum network delay being the maximum amount of time taken for a packet to travel across an autonomous network between any two internal endpoints in the autonomous network, wherein a flow-based deterministic algorithm implemented in all switching elements in the autonomous network is disabled, and wherein all the switching elements are configured to perform per-packet multi-path routing, the per-packet multi-path routing utilizing a round-robin path selection;
   generating, at a first endpoint, a sequence number for a data packet from a plurality of data packets in a network flow between the first endpoint and a second endpoint in the autonomous network, wherein the first endpoint and the second endpoint both comprise a network shim module configured to implement an overlay network that provides at least one virtual link between the first endpoint and the second endpoint over which to conduct the network flow;
   sending, by the first endpoint, the data packet from the first endpoint to the second endpoint over the at least one virtual link provided by the overlay network, the data packet being accompanied by the sequence number;
   receiving the data packet at the second endpoint;
   determining, by the second endpoint, if the data packet is out-of-order in the network flow based on the sequence number;
   in response to determining that the data packet is out-of-order, buffering, by the second endpoint, the data packet and setting a timer to expire after a specific period of time, the specified period of time being based at least in part on the maximum network delay;
   in response to determining that the data packet is not out-of-order, cancelling, by the second endpoint, any pending timer which was started based upon a previous out-of-order data packet, and delivering the data packet and any buffered packets for the network flow in sequence number order to a program executing on the second endpoint; and
   in response to expiration of the timer, delivering the data packet and any buffered packets for the network flow in sequence number order to the program.

2. The method of claim 1, wherein determining whether the data packet is out-of-order in the network flow comprises determining whether the sequence number of the data packet is not one greater than a sequence number of a last received data packet stored within state information maintained at the second endpoint for the network flow.

3. The method of claim 1, wherein the data packet and any buffered data packets for the network flow are delivered in sequence number order to the program even if the buffered packets contain more than one out-of-order packet.

4. The method of claim 1 wherein the maximum network delay is established based upon one or more of: characteristics of network routers in the autonomous network, characteristics of communication links in the autonomous network, processing delays occurring in the network routers in the autonomous network, queuing delays occurring in the network routers in the autonomous network, transmission delays occurring at the endpoints in the autonomous network, or propagation delays across communication links in the autonomous network.

5. A method of maintaining packet order in a network flow over an autonomous network, the method comprising:
   establishing a maximum network delay, the maximum network delay being the maximum amount of time taken for a packet to travel across the autonomous network between any two internal endpoints in the autonomous network;
   configuring all switching elements in the autonomous network to perform per-packet multi-path routing by disabling a flow-based deterministic algorithm implemented therein, the per-packet multi-path routing utilizing a round-robin path selection;
   generating, at a first endpoint, a sequence number for a data packet in the network flow between the first endpoint and a second endpoint;
   encapsulating, by the first endpoint, the data packet and the sequence number into an overlay frame;
   sending, by the first endpoint, the overlay frame to the second endpoint over an overlay network implemented upon the autonomous network;
   receiving the overlay frame at the second endpoint;
   determining, by the second endpoint, if the data packet is out-of-order in the network flow based on the sequence number;
   in response to determining that the data packet is out-of-order, buffering the data packet and setting a timer to expire after a specific period of time, the specified period of time being based at least in part on the maximum network delay;
   in response to determining that the data packet is not out-of-order, cancelling any pending timer which was started based upon a previous out-of-order data packet, and delivering the data packet and any buffered packets for the network flow in sequence number order to a program executing on the second endpoint; and
   in response to expiration of the timer, delivering the data packet and any buffered packets for the network flow in sequence number order to the program.

6. The method of claim 5, wherein the data packet and any buffered data packets for the network flow are delivered in sequence number order to the program even if the buffered packets contain more than one out-of-order packet.

7. The method of claim 5 wherein the maximum network delay is established based upon one or more of: characteristics of network routers in the autonomous network, characteristics of communication links in the autonomous network, processing delays occurring in the network routers in the autonomous network, queuing delays occurring in the network routers in the autonomous network, transmission delays occurring at the endpoints in the autonomous network, or propagation delays across communication links in the autonomous network.

8. A system for maintaining packet order in network flows over an autonomous network comprising a plurality of switching elements configured to perform per-packet multi-path routing, the system comprising:
   a plurality of endpoints connected to the autonomous network, the autonomous network having an established maximum network delay, the maximum network delay being based at least in part on an amount of time for a data packet to travel across the autonomous network between any two internal endpoints in the system, wherein a flow-based deterministic algorithm implemented in each of the plurality of switching elements in the autonomous network is disabled, and wherein each of the plurality of switching elements is configured to perform per-packet multi-path routing, the per-packet multi-path routing utilizing a round-robin path selection; and
   network shim modules executing on the plurality of endpoints implementing an overlay network upon the autonomous network, the network shim modules being configured to
   receive a data packet,
   parse flow data and a sequence number from the data packet, wherein the flow data identifies a network flow comprising a plurality of data packets sent from a source endpoint of the plurality of endpoints to a destination endpoint of the plurality of endpoints connected to the autonomous network, and wherein the sequence number indicates a position of the data packet within a sequence of the plurality of data packets in the network flow,
   determine if the data packet is out-of-order in the network flow based on the sequence number,
   upon determining that the data packet is out-of-order, buffer the data packet and set a timer to expire after a specific period of time, the specified period of time being based at least in part on the maximum network delay, and
   upon determining that the data packet is not out-of-order, cancel any pending timer which was started based upon a previous out-of-order data packet, and deliver the data packet and any buffered packets for the network flow in sequence number order to a program executing on the destination endpoint.

9. The system of claim 8, wherein the network shim modules are further configured to, upon expiration of the timer, deliver any buffered packets for the network flow in sequence number order to the program even if the buffered packets contain more than one out-of-order data packet.

10. The system of claim 8, wherein a network shim module executing on an endpoint delivers the data packet and any buffered packets for the network flow in sequence number order to the program executing on the destination endpoint even if the buffered packets contain more than one out-of-order data packet.

11. The system of claim 8 wherein the maximum network delay is established based upon one or more of: characteristics of network routers in the autonomous network, characteristics of communication links in the autonomous network, processing delays occurring in the network routers in the autonomous network, queuing delays occurring in the network routers in the autonomous network, transmission delays occurring at the endpoints in the autonomous network, or propagation delays across communication links in the autonomous network.

12. A method of maintaining packet order in network flows over an overlay network implemented over an autonomous network comprising switching elements each being configured to perform per-packet, round-robin selection from among multiple best paths to a destination endpoint by disabling a flow-based deterministic algorithm implemented in each of the switching elements, the method comprising executing instructions in the destination endpoint to:

upon arrival of an out-of-order packet, set a timer for a specific period of time; and buffer the out-of-order data packet in a network flow on the autonomous network until the first of the specific period of time expires or the next sequential data packet in the network flow arrives, and then delivering the out-of-order data packet and any buffered data packets in order;

wherein the specific period of time is a maximum network delay established for the autonomous network, the maximum network delay being based at least in part on an amount of time for a data packet to travel across the autonomous network between any two internal switching elements in the autonomous network.

13. The method of claim 12, wherein the network flow comprises a plurality of data packets of a particular protocol transmitted from a source endpoint connected to the autonomous network to the destination endpoint.

14. The method of claim 13, wherein each of the plurality of data packets in the network flow transmitted to the destination endpoint is accompanied by a sequence number indicating the order of the data packet within the network flow, and wherein determining whether a data packet received at the destination endpoint is out-of-order comprises determining whether the accompanying sequence number is not one greater than the sequence number of a last received data packet stored within state information maintained at the destination endpoint for the network flow.

15. The method of claim 12, wherein the out-of-order data packet and any buffered data packets are delivered in order even if the buffered packets contain more than one out-of-order data packet.

16. The method of claim 12 wherein the maximum network delay is established based upon one or more of: characteristics of network routers in the autonomous network, characteristics of communication links in the autonomous network, processing delays occurring in the network routers in the autonomous network, queuing delays occurring in the network routers in the autonomous network, transmission delays occurring at the endpoints in the autonomous network, or propagation delays across communication links in the autonomous network.

* * * * *